Dec. 23, 1958  H. O. KELSEY  2,865,642
TOOLHOLDER FOR REAMERS AND THE LIKE
Filed Dec. 7, 1956
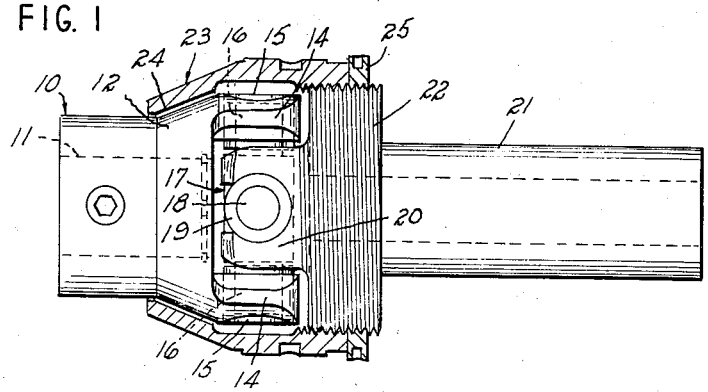
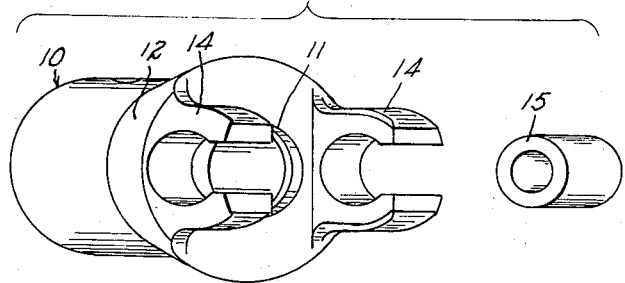
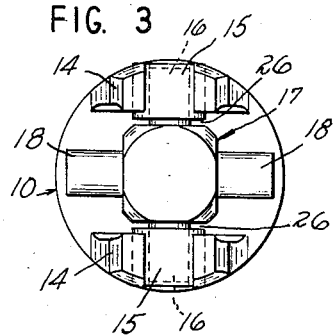
INVENTOR.
HERBERT O. KELSEY
BY
Lindsey and Prutzman
ATTORNEYS

United States Patent Office 2,865,642
Patented Dec. 23, 1958

2,865,642

TOOLHOLDER FOR REAMERS AND THE LIKE

Herbert O. Kelsey, Elmwood, Conn.

Application December 7, 1956, Serial No. 626,868

2 Claims. (Cl. 279—16)

This invention relates to a novel and improved toolholder for reamers and the like.

It is an object of this invention to provide a novel and improved toolholder for mounting reamers and the like on the spindle of a power tool which will permit precision reaming of holes which are out of alignment with the tool spindle regardless of whether the misalignment is due to angularity or displacement, or both, of the hole relative to the spindle; which will perform satisfactorily during both entrance and withdrawal of the tool from the work without any resulting bell-mouthing, oversize, or scoring of the hole; which will minimize the effect of side thrust on the tool when the tool and spindle are angularly related; which will be free from tool chatter and vibration; and which will be of a construction which is simple and economical and which will provide a long service life free of costly repairs and replacements.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Fig. 1 is a side view of a toolholder constructed in accordance with the invention, with a portion of the toolholder in section;

Fig. 2 is a perspective view of a portion of the toolholder; and

Fig. 3 is an end view of a portion of the toolholder.

With reference to the drawings, a toolholder constructed in accordance with the invention comprises a tool supporting member or chuck 10 which is provided with a throughbore 11 for receiving the shank of a reamer and the like. As can be seen on Fig. 1, a snap ring is mounted within one end of the bore to limit extension of the reamer therein and a set screw is provided to lock the tool within the chuck. The tool chuck 10 is further provided with an external conical surface 12 which is disposed coaxially thereof for a purpose which will be hereinafter described.

With particular reference to Figs. 2 and 3, the chuck 10 is provided with a pair of bifurcated supports 14 extending from one end thereof, and each carrying a bushing or bearing 15. Pivotally and slidably mounted in the bearings 15 are a pair of trunnions 16 of a gimbal-like connector 17. The connector 17 has a solid body and is also provided with a second pair of trunnions 18 disposed at right angles to and lying in the same plane as the trunnions 16. The trunnions 18 are pivotally and slidably mounted in bearings 19 which in turn are mounted in a pair of bifurcated supports 20 on the shank 21 of the tool. The supports 20 are generally similar to the supports 14 of the chuck 10, and while only one of the said supports is shown in Fig. 1, it is understood that another such support is disposed diametrically opposite thereto. As is most clearly seen in Fig. 3 the body of the connector 17 is spaced from the bearings 15 as at 26 thereby permitting limited sliding movement of the trunnions 16 in the bearings and relative to the chuck 10. It is to be understood that the connector 17 is similarly spaced from the bearings 19 supported on the shank 21 whereby limited sliding movement of the trunnions 18 is permitted relative to the shank. Thus it can be seen that the chuck 10 is mounted for limited movement, relative to the shank 21 in directions axially of the trunnions 16, axially of the trunnions 18 and in combination thereof. From the above it should be apparent that the chuck 10 and shank 21 are connected by a universally pivotable connection to permit precision machining of a hole, the axis of which is angularly related to the axis of the shank 21, and further that the limited movement of the chuck in directions axially of the trunnions 16 and 18 permits precision machining of a hole, the axis of which is displaced relative to the axis of the shank while not interfering with the universally pivotal connection between the shank and chuck so that a hole which is in angular as well as displaced misalignment may be precision machined.

The shank 21 is provided with an externally threaded portion 22 which is engageable with the threaded portion of an adjustable collar or sleeve 23 which forms an enclosing housing for the pivotal connection between the shank 21 and chuck 10. The collar 23 is provided with an internal conical surface 24 generally complementary to the external conical surface 12 of the chuck 10 and engageable therewith to limit the movement of the chuck relative to the shank. A lock ring 25 is also threadably engaged with the threaded portion 22 of the shank and is engageable with the collar 23 to lock the collar in any desired adjusted position.

In the use of the above described tool, when it is desired to machine a hole which is alignable with the shank 21 the collar 23 is moved rightwardly, as viewed in Fig. 1, until the conical surfaces 12 and 24 are in engagement, whereby the chuck 10 and shank 21 will be coaxially aligned. When a series of holes are to be machined such as in an automatic operation, it is usual that the alignment or misalignment of the holes and the shank 21 will vary. The collar 23 will then be backed off to permit sufficient movement of the chuck relative to the shank to provide for the range of misalignment which will be encountered. The collar 23 will thus limit the maximum movement of the chuck relative to the shank and preventing the end of the tool, which projects some distance from the tool holder, from being excessively misaligned with the hole upon initial engagement with the work and assure free entry of the tool. While the toolholder of this invention is particularly suited for reaming operations, it should be understood that it is equally adaptable to other machining operations such as center boring and tapping. It should be particularly noted that the movement of the chuck member relative to the shank is available during withdrawal of the tool as well as entrance thus assuring that there will be no scoring or enlargement of the hole on withdrawal. It should be particularly noted that the novel construction of the tool holder whereby both pairs of trunnions in the same plane assures that the transfer of any side thrusts from the chuck to the connector 17 will occur in the same plane as the transfer of side thrusts from the connector to the shank, thus eliminating any increase in the effect of side thrust due to spacing of the points of transfer. Further the end of the tool in the chuck will be very close to the plane of the trunnions so that the effect of side thrusts imposed on the chuck thereby, will not be materially increased in its transfer to the connector. Thus, a tendency of the tool to enlarge the hole because of side thrusts occurring when the tool is angularly related to the shank has been materially reduced if not substantially eliminated.

The relatively short, rugged design of the toolholder assures freedom from vibration and tool chatter which is of particular importance when using carbide or carbide tipped tools; and the compactness of the toolholder permits the use of the toolholder on automatic machines where space is at a premium.

I claim:

1. In a toolholder for reamers and the like, a rotatable cylindrical shank having a pair of short trunnion supports depending from one end of the shank and disposed respectively on diametrically opposite sides of the shank, a rotatable chuck member adapted to carry a reaming tool and the like and having a pair of up-standing short trunnion supports extending from one end thereof and from diametrically opposite sides of the chuck member in a direction opposite the trunnion supports on the shank, a connecting member having a solid body and a pair of trunnions extending from the body and slidably and pivotally received by the trunnion supports on the shank and a second pair of trunnions extending from the body at right angles and lying in the same plane as the first pair and pivotally and slidably received by the trunnion supports on the chuck member, the chuck member having a shallow external conical surface extending coaxially thereof and tapering toward the other end thereof, and an external collar threadably mounted on the shank for movement longitudinally thereof and having an internal shallow conical surface engageable with the conical surface on the chuck member to limit relative sliding and pivotal movement between the chuck member and shank.

2. In a toolholder for reamers and the like, a rotatable cylindrical shank having a pair of short bifurcated trunnion supports integrally depending respectively from diametrically opposite sides of one end of the shank, the shank having an external threaded portion contiguous with the upper end of the trunnion supports and extending toward the other end of the shank, a chucking member having a throughbore coaxially alignable with the shank and having an external shallow conical surface disposed coaxially of the bore, a pair of short bifurcated trunnion supports integral with the chucking member and extending longitudinally of said bore and toward the shank from the wider end of said conical surface and disposed on diametrically opposite sides of the chucking member, a radially inwardly extending shoulder in said bore closely adjacent the inner end thereof and engageable with a tool received in the bore to limit extension of the tool into the bore, a gimbal member having two pairs of coplanar trunnions extending respectively at right angles to each other with one of the pairs of trunnions being slidably and pivotally engaged within the trunnion supports of the shank and with the other pair of trunnions being slidably and pivotally engaged within the trunnion supports of the chucking member, an elongated collar slidably engaged at one end with the threaded portion of the shank and extending toward the chucking member and enclosing the trunnion supports and gimbal member and having a shallow conical surface at its other end engageable with the conical surface on the shank to limit relative sliding and pivotal movement between the shank and chucking member, and a locking ring threadably engaged on the threaded portion of the shank and engageable with said one end of the collar to lock the collar in selected adjusted position.

References Cited in the file of this patent
UNITED STATES PATENTS

| | | |
|---|---|---|
| 2,037,281 | Spicer | Apr. 14, 1936 |
| 2,626,812 | Jones | Jan. 27, 1953 |
| 2,700,548 | Ehrich | Jan. 25, 1955 |